W. G. CANION.
COMPOUND AIR BRAKE.
APPLICATION FILED JUNE 28, 1921.

1,430,359.

Patented Sept. 26, 1922.
6 SHEETS—SHEET 2.

Witnesses
F. C. Gibson
J. W. Garner

Inventor
William G. Canion.
By Victor J. Evans
Attorney

W. G. CANION.
COMPOUND AIR BRAKE.
APPLICATION FILED JUNE 28, 1921.

1,430,359.

Patented Sept. 26, 1922.
6 SHEETS—SHEET 5.

Inventor
William G. Canion

By Victor J. Evans
Attorney

Witnesses
F. C. Gibson
J. W. Garner

Patented Sept. 26, 1922.

1,430,359

UNITED STATES PATENT OFFICE.

WILLIAM G. CANION, OF BALTIMORE, MARYLAND, ASSIGNOR TO CANION AIR BRAKE COMPANY, OF BISBEE, ARIZONA, A CORPORATION OF ARIZONA.

COMPOUND AIR BRAKE.

Refiled for abandoned application Serial No. 846,831, filed June 23, 1914. This application filed June 29, 1921. Serial No. 481,165.

*To all whom it may concern:*

Be it known that I, WILLIAM G. CANION, a citizen of the United States, residing at Baltimore, in the State of Maryland, have invented certain new and useful Improvements in Compound Air Brakes; and I do hereby declare the following to be a full, clear, and exact description of the invention, such as will enable others skilled in the art to which it appertains to make and use the same.

This invention is an improved compound air brake apparatus adapted to automatically take up the slack in the brake chain and to also automatically adjust a brake beam to compensate for the wear of the brake shoes and embodying a prime moving brake applying and slack adjusting piston arranged in and movable independently of the main brake applying piston which operates in the brake cylinder, and means for automatically controlling the operation of said pistons as hereinafter described and claimed.

This invention is an improvement on the compound air brake apparatuses described and claimed in my co-pending application for Letters-Patent of the United States, filed Sept. 25, 1913, Serial No. 791,809, allowed May 5, 1914, and my copending application for Letters-Patent, Serial No. 819,265, filed Feb. 17, 1914, allowed June 5, 1914.

One object of the present invention is to provide improved fluid pressure brake apparatus of this character including a plurality of brake operating pistons, a brake cylinder in which they operate, and means to utilize a charge to move the pistons to brake applying position and one in advance of another.

Another object of the invention is to provide means for automatically locking the pistons together when in brake applying position and to automatically disconnect the pistons when they are moved to release position.

Another object of my invention is to provide improved fluid pressure brake apparatus of this character providing a plurality of brake operating pistons, a cylinder in which they operate and automatically operating means to utilize a charge to move the pistons to brake applying position one in advance of another.

Another object of my invention is to effect improvements in the construction of the controlling valve carried by the main brake piston and which controls the operation of the prime acting piston.

Another object of my invention is to provide improved compound air brake apparatus which may be used in connection with ordinary air brake apparatus.

Another object is to provide an improved compound air brake apparatus which operates automatically when pressure is reduced through the train pipe and which is at all times under direct control.

Another object of my invention is to provide improved compound fluid pressure brake apparatus the portions of which are cushioned by compressed fluid when in ordinary brake applying position and prevented from locking the car wheels.

Another object of my invention is to provide fluid pressure brake apparatus of this character which effects a considerable economy of fluid under pressure in its operation.

Another object of my invention is to provide an improved compound air brake apparatus in which the controlling valve is actuated directly by air pressure and is prevented from sticking or getting out of order.

Another object of my invention is to provide improved compound air brake apparatus in which the pistons respond instantly to variations in air pressure so that the brakes are instantly applied when desired.

In the accompanying drawings:—

In accordance with my invention the brake cylinder 1 in which the main brake operating piston 2 is mounted is connected to an auxiliary reservoir 3. A pipe 4 is here shown for connecting the auxiliary reservoir to the rear end of the cylinder, the pipe being secured in a port in the rear head 5 of the cylinder. A bypass pipe 6 also connects the auxiliary reservoir with the brake cylinder, said pipe being attached to a port 7 in the wall of the cylinder at a point near but spaced from the rear head. The train pipe 8 is shown connected directly to the outer or front head 9 of the brake cylinder, with a packing box 10 having a gland 11 which is connected and secured to the head 9 by means of bolts 12. A brake lever is indicated at 13.

The main brake piston 2 comprises a cylinder 14 formed by a cylindrical wall 15 having outstanding flanges 16—17 at its front and rear ends, a front head 18 secured by bolts 19 to the front end of said wall and a rear head 20 by screws 21 to the rear end of said wall. The piston 2 is of somewhat less diameter than the bore of the brake cylinder so that a slight space is formed between the flanges of said piston and the wall of the cylinder bore. At the rear end of the main brake piston is a packing ring 22 which is secured between the rear end of the wall 15 and the rear head 20 by the screws 21 and this packing ring is provided with an expander 23. The piston rod 24 of the main brake piston is tubular and operates in the stuffing box and is provided at its outer end with an enlarged cylindrical head 25 which is here shown as open at its front end.

Cushioning and reacting springs 26 arranged in recesses 27 in the rear or inner head of the brake cylinder 1, project forwardly from said rear head and are adapted to engage in recesses 28 of the rear head of the main brake piston and to be compressed when the main brake piston is at the inner end of its stroke, in full release position, these springs being sufficiently strong to then force the main brake piston forwardly a sufficient distance to cause its packing ring 22 to close the port 7.

Figures 1, 2:
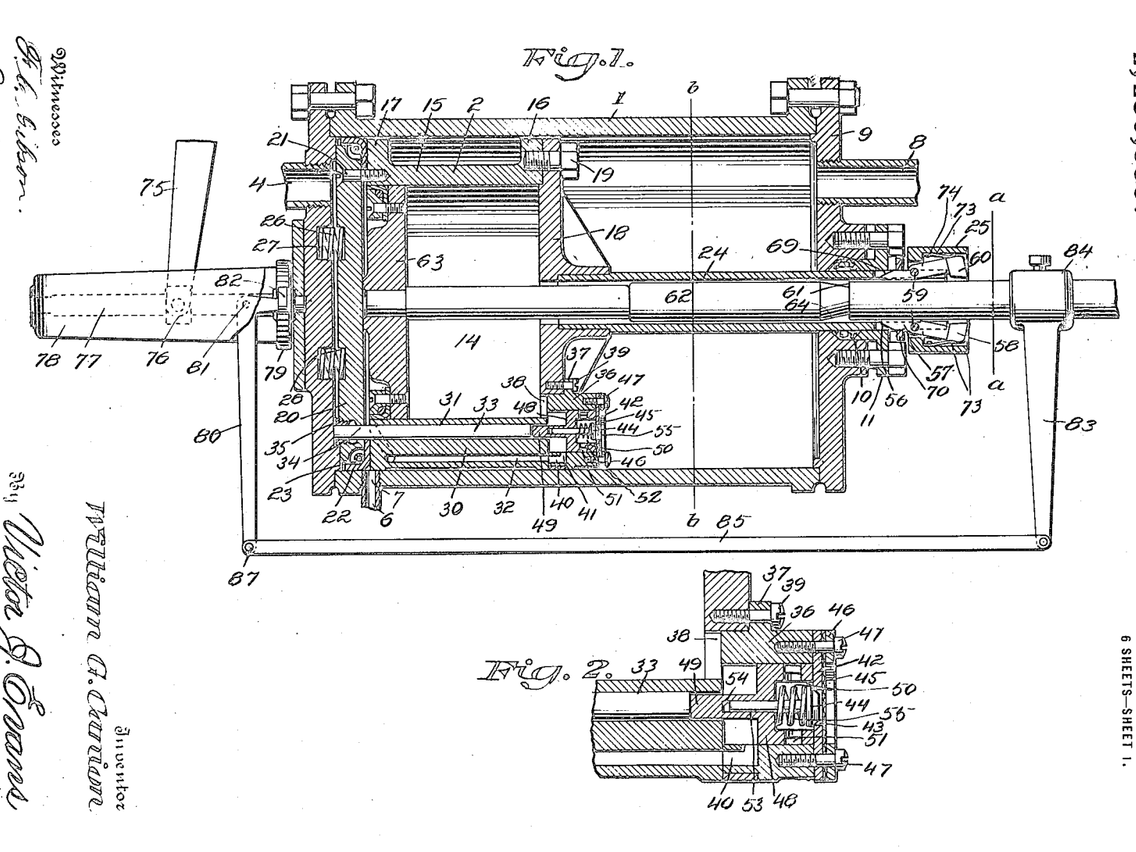
Figure 1 is a vertical longitudinal sectional view of compound air brake apparatus constructed in accordance with my invention and in full release position.
Figure 2 is a detail sectional view, on a larger scale, of the controlling valve.

The main brake piston is provided on one side with an enlargement 30 through which extends a bore 31. A passage 32 is also made in the said enlargement and extends from the front of the enlargement to the rear end of the cylinder formed in said main brake piston. A valve operating thrust bar 33 is arranged for longitudinal movement in the bore 32 and in a bore 34 formed in the rear head 20 of the main brake piston, the rear end of said thrust bar projecting from the rear end of the main brake piston and being arranged in a stuffing box 35 with which the head 20 is provided. A cylindrical valve casing 36 is provided with an annular flange 37 and has its rear end secured in an opening 38 in the front head 18 of the main brake piston by bolts 39. In the rear portion of the said valve casing, at one side thereof, is a passage 40 which communicates with the passage 32 and also communicates with the interior of said valve casing through a port 41. The front end of the valve casing is formed by a head 42 which has a central opening 43 that forms also a seat for the conical head of a check valve 44. A screen 45 covers the front face of the head 42, extends across the opening 43 and is secured by a ring 46 and bolts 47, which also secure the head 42 on the front end of the valve casing. A cylindrical controlling valve 48 operates in the bore of the valve casing 36 and has a stem 49 which operates in the front portion of the bore 31 and engages the front end of the thrust bar 33. This controlling valve has a chamber 50 in its center, open at its front end, and also has a port 51 which is formed by an annular channel around the valve and which communicates with the chamber 50 at points indicated at 52. When the valve is at the front end of the valve casing its port 51 is out of register with the port 41 and when said valve moves rearwardly in the valve casing its port 51 registers with the port 41, as will be understood. The check valve 44 has a stem 53 which operates in a bore 54 in the controlling valve. A light spring 55 is provided which closes the check valve in the opening 43 when pressure is equalized on both sides of the check valve but said spring is not sufficiently strong to prevent movement of the check valve when there are variations in the pressure on opposite sides thereof.

The tubular rod 24 of the main brake piston is provided near its outer end with openings 56 in which the trip arms 57 of dogs 58 are adapted to operate. The dogs are arranged in the head 25, are pivotally mounted in the head as at 59 and are provided with heads 60 which are adapted to engage a shoulder 61 in the rod 62 of a prime acting brake piston 63 which operates in the cylinder 14 of the main brake piston. The rod 62 has a reduced tapered portion 64 to form the shoulder 61. The piston rod 62 is of less diameter than and extends through the bore of the tubular piston rod 24 and the outer end of the piston rod 62 is connected to the brake lever 13 as at 65. The prime acting brake piston 63 has a packing ring 66 secured to its rear side by a ring 67 and screws 68. The rear ends of the trip arms 57 of the dogs 58 are bevelled to provide cam faces 69.

Figure 3:
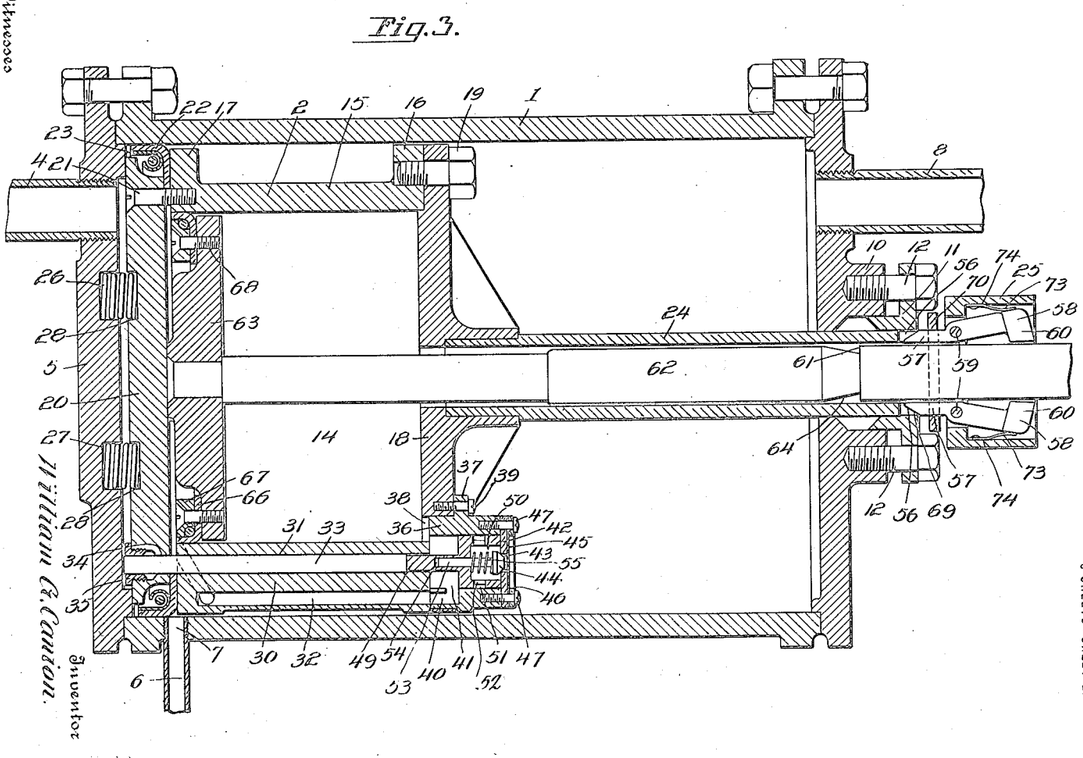
Figure 3 is a vertical longitudinal sectional view on a scale larger than that of Figure 1 of the brake cylinder and pistons and showing the pistons in full release position.

A trip ring 70 is arranged a suitable distance in front of the stuffing box of the brake cylinder 1 and is secured and held in place by means of bolts 71 which have nuts 72 which bear against opposite sides of the said trip ring. When the apparatus is in full release position as shown in Figure 3 the port 7 is open so that air pressure is equalized in the brake cylinder and in the auxiliary reservoir, the port 41 is open and the trip arms 57 are in and engaged by the trip ring 70 so that the dogs 58 are held in open, release position against the tension of their springs 73. Said springs are secured at their inner ends in the head 25 as at 74, their free ends bearing on the outer sides of the dogs.

The brake pistons stay in full release position only a short time, enough to equalize pressure in the brake cylinder and auxiliary reservoir, the cushioning springs 27 acting to move the main brake piston forwardly a slight distance, so as to cause its packing element 22 to close the port 7 and hence cut off communication through the bypass duct or pipe 6 between the brake cylinder 1 and the auxiliary reservoir.

Figure 4:
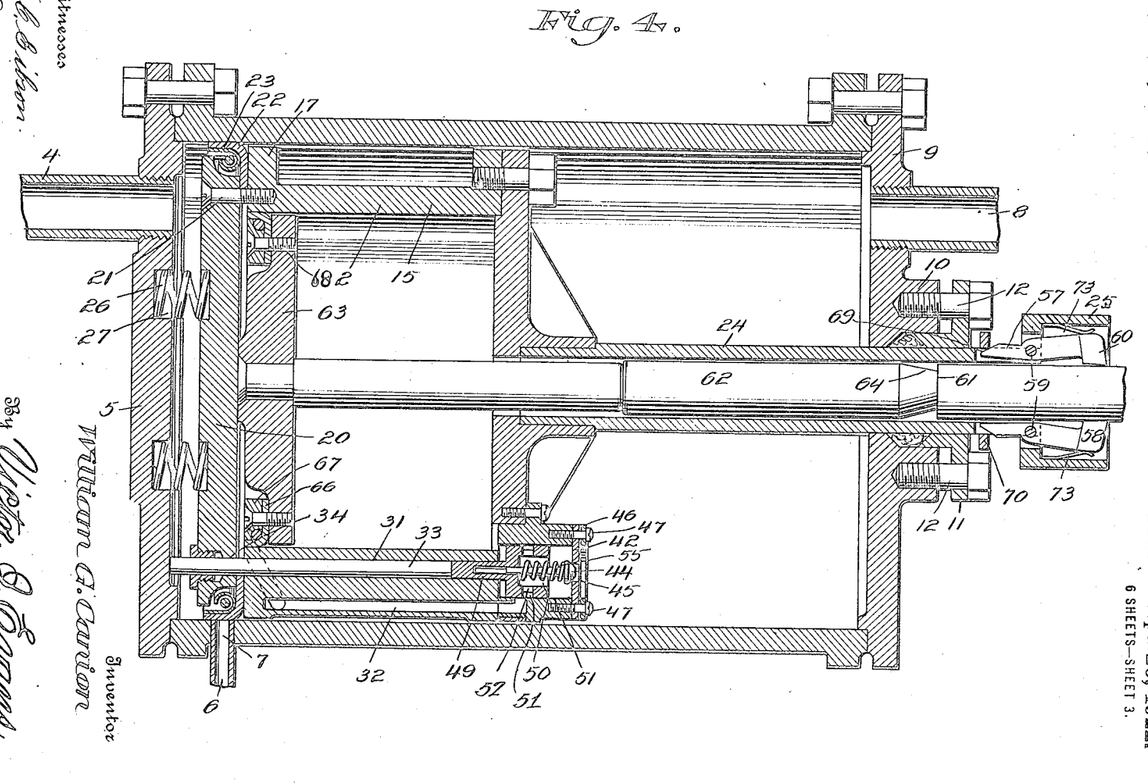
Figure 4 is a similar view of the same with the brake pistons in running position.
Figure 5:
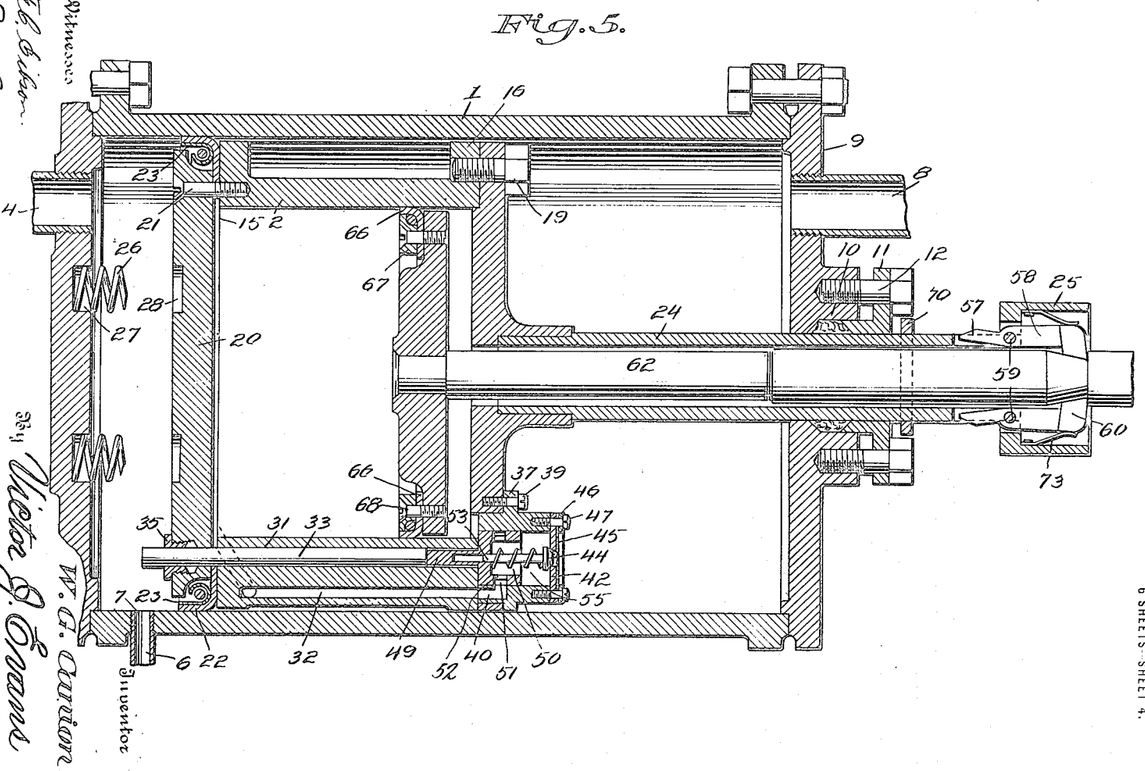
Figure 5 is a similar view of the same with the pistons in brake applying position.
Figures 6, 7, 10, 11:
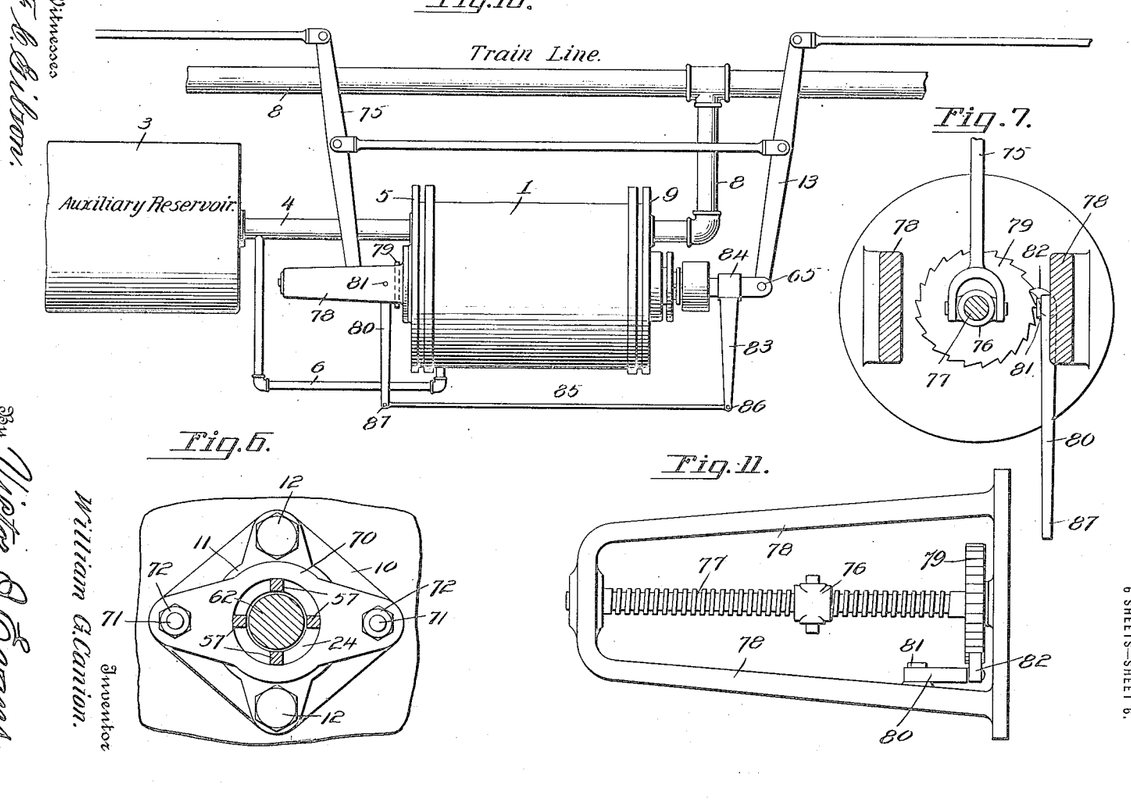
Figure 6 is a detail section showing the trip ring which operates the dogs.
Figure 7 is a detail sectional view showing the step by step mechanism for automatically adjusting the brake beam to compensate for wear of the brake shoes.
Figure 10 is a diagrammatical plan of the entire brake mechanism.
Figure 11 is a detail plan of the slack adjuster.
Figure 8:
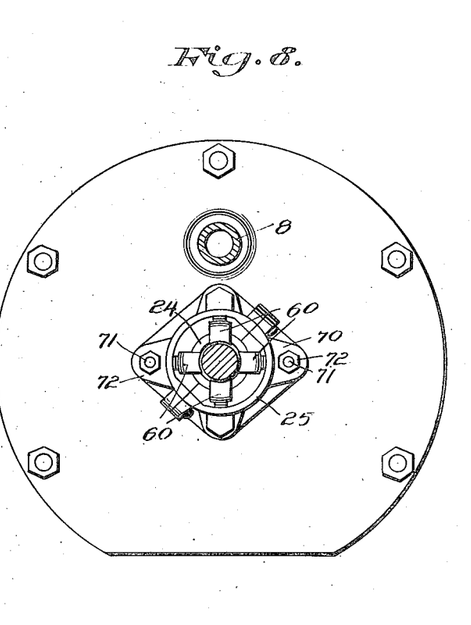
Figure 8 is a vertical transverse sectional view on the plane indicated by the line a—a of Figure 1.
Figure 9:
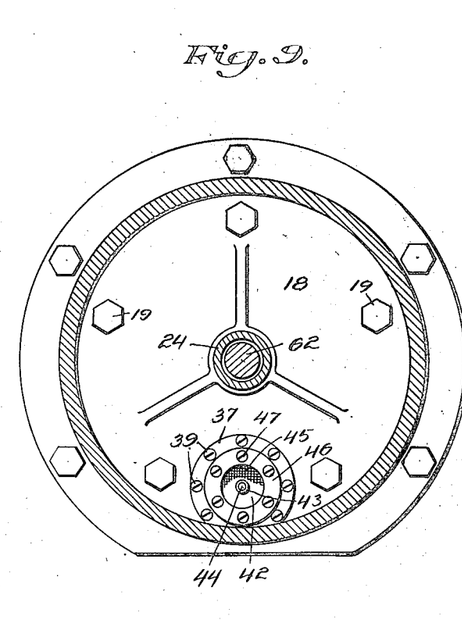
Figure 9 is a similar view on the plane indicated by the line b—b of Figure 1.

To apply the brakes, the ports being in the running position shown in Figure 4, pressure is reduced in the front end of the brake cylinder through the train pipe in the usual way. This causes pressure from the auxiliary reservoir through the port 4, to be exerted in the rear or inner end of the cylinder 1 and to move the main brake piston forwardly a sufficient distance to cause the dogs, which move forwardly therewith, to be released from the trip ring 70. The controlling valve tends to remain stationary owing to the pressure in the cylinder 1, but moves relatively to the main brake piston so that its port 51 registers with the port 41, thereby establishing communication between the front end of the cylinder 1 and the rear portion of the cylinder 14 in the main brake piston, through the duct formed by the opening 43, chamber 50, port 51, port 41, and passages 40 and 32, as will be understood, the spring 55 yielding and permitting the check valve to open sufficiently for this purpose. Only a slight reduction of train pipe pressure is necessary but one that will give sufficient movement of the main brake piston to permit of a full opening of the controlling valve 33. After the main brake piston has moved this required slight distance the piston stops or slows and the smaller prime acting piston 63 moves forward more rapidly, applying the brakes at moderate pressure such as is ordinarily required to stop or control a train. The movement of the rod 62 with the piston 63 causes the shoulder 61 of said rod to reach the heads of the dogs and thereupon the spring 73 engage the dogs with such shoulder, thereby locking the main brake piston and the prime acting brake piston together and if a further reduction of the pressure is effected, as in an emergency or where the entire power of the brake apparatus is desired both pistons move forwardly together and apply their power to the brakes.

To release the brakes pressure is increased in the front end of the cylinder 1 in the usual way and the pistons move rearwardly together until the cam faces 69 of the arms 57 of the dogs are engaged by the trip ring and the latter thus causes said arms 57 to be moved toward each other and the dogs to be opened and disengaged from the shoulder 61 of the rod of the prime acting brake piston. Thereafter the pistons can complete their reverse movement independently of each other. The prime acting piston continues to move rearwardly with the main piston until the thrust bar 33 strikes the rear end of the brake cylinder 1 and causes the controlling valve to move forwardly, thus cutting off communication between the ports 41 and 51 and opening communication between the port 41 and the cylinder 14 of the main brake piston, thus relieving the pressure back of the prime acting piston 63 and causing the compressed air thus relieved to be exhausted into the air through the duct 32, port 41, the front portion of the cylinder 14 and the bore of the tubular main brake piston rod 24 which also as before stated is of somewhat larger diameter than the rod 62 of the prime acting brake piston 63.

The spring 55 serves to close the check valve 44 when the pressure is approximately equal in the main brake piston cylinder 14 and the brake cylinder 1. The said check valve when thus closed prevents pressure in the piston cylinder 14 from being reduced when a reduction of pressure is effected in the front end of the main brake cylinder. Hence the pressure in the piston cylinder 14 holds the piston 63 in forward position, locked to the piston 2 by dogs and with cam portions 64 of the rod 62 pressing forwardly and tending to trip the dogs. This prevents the dogs from binding against the shoulder 61 and interfering with the brake release operation of the apparatus.

One especial advantage of the improved construction of my brake apparatus is that the valves are positively operated by the air pressure so that they are prevented from sticking. Moreover the pistons respond instantly to variations in the air pressure so that the brakes are instantly applied when desired. Assuming that there is a pressure of 70 pounds in the apparatus, with a reduction of 5 pounds in the front end of the brake cylinder 1 the controlling valve is operated by a pressure of 65 pounds, so that there is no possibility of its sticking. The dogs lock the two piston rods together and enable the pistons to operate as one when in service and under more than usual pressure, and enables them to move back to release position independently of each other. In the event that there should be a leakage allowing air to leak from behind the prime acting piston back into the front end of the brake cylinder, the dogs which serve to lock the two pistons together prevent release movement of the prime acting piston, thus holding the brakes.

The main brake lever 75 has a travelling nut 76 connected thereto, this travelling nut being engaged by an adjusting screw shaft 77 which is mounted in bearings in a suitable support 78 at the rear end of the brake cylinder. A ratchet wheel 79 which has relatively fine or narrow ratchet teeth is secured on said screw shaft to turn therewith. A bell crank lever 80 is suitably mounted as at 81 and has a short arm which carries a dog 82 which is adapted to engage the ratchet wheel. An arm 83 is secured as at 84 to the rod 62 of the prime acting brake piston 63 and this arm 83 is connected by a link rod 85 to the longer arm of the bell crank lever 80, being pivotally connected as at 86—87 to said arm 83 and said long arm of the bell crank lever. The adjusting screw shaft is turned by a step by step movement and operated by the bell crank lever. On each maximum service movement of the prime acting brake piston the ratchet wheel is turned a distance equal to the width of the space between two of its teeth, thus slightly turning the screw shaft and hence correspondingly moving the travelling nut and causing the latter to minutely adjust the main brake lever and cause the latter to take up the slack occasioned by the wearing away of the brake shoes. The ports are so proportioned as to cause the main brake lever to be adjusted the required distance at each maximum operation of the brakes to compensate for the resulting wear of the brake shoes. Hence the brakes automatically adjust themselves and are at all times kept in condition for instant operation and lost motion is prevented.

My improved compound air brake apparatus is adapted for use on elevators and the like as well as on railway trains.

Having thus described my invention, I claim:—

1. In fluid pressure brake apparatus of the class described, the combination of a brake cylinder, a main brake piston in the brake cylinder and having a cylinder movable with said piston, a prime acting brake piston in the cylinder of the main brake piston, a fluid pressure operated controlling valve carried by the main brake piston to charge the cylinder of the main brake piston from the brake cylinder on an initial braking movement of the main brake cylinder and cause the prime acting piston to move in said main piston, and means actuated by release movement of the main piston to cause said valve to relieve pressure in the cylinder of the main piston behind the prime acting piston, said valve operating means including a thrust rod carried by the main piston.

2. In fluid pressure brake apparatus of the class described, the combination of a brake cylinder, a main brake piston in the brake cylinder and having a cylinder movable with said piston, said piston cylinder being provided with a valve casing communicating with the front end of said piston cylinder and also having a port, and said piston cylinder having a duct leading from said port to the rear end of said piston cylinder, a prime acting brake piston in the cylinder of the main brake piston, a valve in the casing, movable by fluid pressure on an initial braking movement of the main piston to cut off communication between the ends of said piston cylinder and establish communication between the brake cylinder and the rear end of said piston cylinder and thereby cause the prime acting piston to be moved to braking position, and means operated by release movement of the main brake piston to cause said valve to cut off communication between the brake cylinder and the cylinder of the main brake piston and to also relieve pressure in the cylinder of the main brake piston behind the prime acting piston.

3. In fluid pressure brake apparatus of the class described, the combination of a brake cylinder, a main brake piston in the brake cylinder and having a cylinder movable with said piston, said piston cylinder being provided with a valve casing communicating with the front end of said piston, a duct leading from said port to the rear end of said piston cylinder, a prime acting brake piston in the cylinder of the main brake piston, a valve in the casing, movable by fluid pressure on an initial braking movement of the main piston to cut off communication between the brake cylinder and the rear end of said piston cylinder and thereby cause the prime acting piston to be moved to braking position, and means operated by release movement of the main brake piston to cause said valve to cut off communication between the brake cylinder and the cylinder of the main brake piston and to also relieve pressure in the cylinder of the main brake piston behind the prime acting piston and a check valve carried by said controlling valve to close against back pressure when said valve is in the required position to charge the cylinder of the main brake piston.

4. In fluid pressure brake apparatus of the class described the combination of a brake cylinder having an intermediate port and a duct connecting said port to the rear end of said cylinder, a main brake piston to open said port when in full release position, means to move said piston to running position and cause the same to close said port, a cylinder carried by said piston and having a duct leading from the rear end of said cylinder to the interior of the brake cylinder, a valve to control said duct and thereby charge and relieve said piston cylinder and a prime acting brake piston arranged to operate in the cylinder of said main brake piston.

5. In fluid pressure brake apparatus of the class described the combination of a brake cylinder having an intermediate port and a duct connecting said port with the rear end of said cylinder, a main brake piston to open said port when in full release position, means to move said piston to running position and cause the same to close said port, a cylinder carried by said main brake piston and having a duct leading to the rear end of said cylinder, a valve casing carried by said piston cylinder and having a port communicating with the interior of the brake cylinder, a relief port for the piston cylinder and a port forming one end of said cylinder duct, a valve in said casing, actuated by said brake cylinder pressure to close the relief port and open the charging port of the cylinder of the main brake piston on an initial movement of said piston, a prime acting brake piston arranged to operate in the cylinder of the main brake piston and means operative on release movement of the main brake piston to cause said controlling valve to relieve pressure in the cylinder of the main brake piston behind the prime acting brake piston.

6. In fluid pressure brake apparatus of the class described the combination of a brake cylinder having an intermediate port and a duct connecting said port to the rear end of said cylinder, a main brake piston to open said port when in full release position, counter-acting cushioning means to move said piston to running position and cause the same to close said port, a cylinder carried by said piston and having a duct leading from the rear end of said cylinder to the interior of the brake cylinder, a valve to control said duct and thereby charge and relieve said piston cylinder and a prime acting piston arranged to operate in the cylinder of said main brake piston.

7. In fluid pressure brake apparatus of the class described, the combination of a brake cylinder, a main brake piston in the brake cylinder having a cylinder movable with said piston and also having a tubular piston rod; a prime acting brake piston in the cylinder of the main piston, having a piston rod operative in the tubular rod of the main cylinder, means operative on an initial movement of the main piston to charge the cylinder thereof and cause the prime acting piston to move therein, means to lock the piston rods of said pistons together after an initial braking movement of the prime acting piston, and means actuated by release movement of the main piston to cause said charging means to relieve pressure in the cylinder of the main piston behind the prime acting piston.

8. In fluid pressure brake apparatus of the class described, the combination of a brake cylinder, a main brake piston in the brake cylinder having a cylinder movable with said piston and also having a tubular piston rod; a prime acting brake piston in the cylinder of the main piston, having a piston rod operative in the tubular rod of the main cylinder, means operative on an initial movement of the main piston to charge the cylinder thereof and cause the prime acting piston to move therein, means to lock the piston rods of said pistons together after an initial braking movement of the prime acting piston, means actuated by release movement of the main piston to cause said charging means to relieve pressure in the cylinder of the main piston behind the prime acting piston, and means to disconnect said pistons during brake release movement.

In testimony whereof, I affix my signature.

WILLIAM G. CANION.